United States Patent
Herrmann et al.

(10) Patent No.: US 6,253,412 B1
(45) Date of Patent: Jul. 3, 2001

(54) WIPER BLADE AND REPLACEMENT KIT FOR A WIPER BLADE

(75) Inventors: Volker Herrmann, Tauberbischofsheim; Bruno Egner-Walter, Heilbronn, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/424,121
(22) PCT Filed: Feb. 2, 1999
(86) PCT No.: PCT/EP99/00682
 § 371 Date: Nov. 17, 1999
 § 102(e) Date: Nov. 17, 1999
(87) PCT Pub. No.: WO99/47398
 PCT Pub. Date: Sep. 23, 1999

(30) Foreign Application Priority Data

Mar. 18, 1998 (DE) ............................................... 198 11 702

(51) Int. Cl.⁷ ....................................................... B60S 1/38
(52) U.S. Cl. ....................................................... 15/250.454
(58) Field of Search ........................ 15/250.451, 250.452, 15/250.453, 250.454, 250.44

(56) References Cited

U.S. PATENT DOCUMENTS

| | | | |
|---|---|---|---|
| 3,153,254 | 10/1964 | Lenz | 15/250.454 |
| 3,823,437 | 7/1974 | Hauke | 15/250.454 |
| 3,885,265 | * 5/1975 | Deibel et al. | 15/250.454 |
| 3,940,823 | * 3/1976 | Rosenbeck | 15/250.454 |

FOREIGN PATENT DOCUMENTS

| | | |
|---|---|---|
| 44 17 713 | 5/1994 | (DE) . |
| 195 22 273 | 6/1995 | (DE) . |
| 97/00796 | 1/1997 | (WO) . |

\* cited by examiner

Primary Examiner—Gary K. Graham
(74) Attorney, Agent, or Firm—J. Gordon Lewis

(57) ABSTRACT

The invention concerns a wiper or an exchange kit for a wiper for a windshield wiper installation for the cleaning of a windshield of a vehicle with a wiper blade that is retained on an oblong retaining structure by means of retaining claws of the retaining structure gripping the head strip of the wiper blade from the top and engaging in longitudinal grooves that are formed on opposite longitudinal sides of the head strip. An end bracket that is attached to one end of the head strip retains the wiper blade longitudinally on the retaining structure such that it cannot inadvertently get lost, while a snap-arm that is part of the end bracket traverses the correlated end claw of the retaining structure and snaps into place behind the interior front side of the end claw by means of a snap element. In order to make the exchange of a wiper blade easier, the snap-arm of the end bracket has an essentially oblong flat shape and extends flush along one longitudinal side of the head strip that is part of the wiper blade. The snap element is a tongue that is notched free out of the snap-arm, bent out from the plane of the snap-arm and away from the head strip at an acute angle, with the front edge opposing the interior front side of the end claw as a stop.

20 Claims, 1 Drawing Sheet

WIPER BLADE AND REPLACEMENT KIT FOR A WIPER BLADE

BACKGROUND OF THE INVENTION

1. Field of the Invention

The invention concerns a wiper for a windshield wiper device for the cleaning of a windshield on a vehicle. Additionally, the invention concerns a completely preassembled exchange kit for such a wiper.

2. Description of the Art

A wiper and an exchange kit are already known from EP 0 714 820 Al. On this wiper the exchangeable wiper blade is made out of elastic, rubber-like material and is retained with its head strip in the retaining claws of an extended segmented retaining structure, with the retaining claws gripping partially around the head trip and engaging into longitudinal grooves that are configured on the longitudinal sides of the head strip, opposite from each other. The wiper blade is locked into place longitudinally by means of a spring bracket that is made out of sheet metal and attached to one end of the head strip. Part of this spring bracket is a flat elastic bendable snap-arm that extends from a base part of the spring bracket on the back of the head strip in a longitudinal direction, traversing the correlated retaining claw of the retaining structure and engaging with a hook behind the retaining claw. The hook is formed by the end of the snap-arm that is bent backward and up in the shape of a V, forming a steep angle with the remainder of the snap hook. The front side of the hook interacts as a stop with the internal front side of the retaining claw of the retaining structure. In an advantageously simple manner, a wiper is completed as a preassembled exchange kit by attaching a spring rail and a spring bracket that is attached to the head strip which can be attached to the retaining structure by insertion in a longitudinal direction into the claws of the retaining structure. The arm of the spring bracket that bears a hook snaps automatically into the retaining claw of the retaining structure under the impact of the insertion force.

However, the inevitable later disassembly of the wiper blade that must be replaced becomes a problem when a new wiper blade or a new exchange kit must be installed. In a manual operation, the hook or the snap-arm of the spring bracket that is configured into a hook must be bent against its elastic reset force in order to disengage the locking therebetween. Simultaneously, the wiper blade must then be extracted from the retaining claws of the retaining structure. Because the snap-arm is located between the backside of the head strip and the lower side of the retaining structure, it is difficult to obtain access to the snap-arm to be disengaged. Also, the hook itself, because of the plastic molded shape of the V-shaped bend, is hard to compress any further against its elastic restoring force. A large amount of force is needed in order to disengage the longitudinal locking of the wiper blade or of the exchange kit from the retaining structure. This is why such manipulation, which can only be conducted with a tool, is of some difficulty for the person conducting it, and requires a degree of mechanical dexterity.

It is the task of the invention to improve a wiper of the initially described type in a manner that makes both its disassembly and assembly easier when exchanging the wiper blade or the exchange kit such that mechanical dexterity is not required on the part of the person conducting the work. In addition, a simple way to handle the exchange kit for a wiper blade is to be provided.

SUMMARY OF THE INVENTION

The basic idea underlying the invention is to locate the snap element that pertains to the end bracket in a location that permits easy access for the purpose of disengaging the locking mechanism, and to configure the snap element, or the end bracket, in such away that, on the one hand, a safely functioning locking of the wiper blade or of the exchange kit on the retaining structure of the wiper is guaranteed, and, on the other hand, the locking mechanism can be disengaged easily and with little force.

The fact that only one snap-arm with one snap element is located on the end bracket already makes handling simpler than would be the case with one end bracket with two snap-arms. Locating the single snap-arm on the longitudinal side of the head strip as part of the wiper blade guarantees direct and undisturbed access to the snap element. The configuration of the snap element in the shape of a tongue notched out of the snap-arm that is bent away from the head strip and up from the snap-arm at a steep angle, and, with its free front side, opposes the interior front side of the end claw of the retaining structure of the wiper as a stop, provides a functionally safe longitudinal lock, and also guarantees that the locking mechanism can be disengaged with relatively little force. Thus, a wiper and an exchange kit for a wiper have been developed that can be installed or exchanged by a technically inexperienced and unskilled person. When inserting the exchange kit in a longitudinal direction into the retaining claws of the retaining structure, the snap-arm of the end claw engages automatically with the corresponding end bracket. When disassembling, the tongue that is configured on the snap-arm of the end bracket must be pressed against its relatively low spring force and against the longitudinal side of the head strip that pertains to the wiper blade, and the exchange kit must be extracted longitudinally from the retaining structure. Depending on the geometrical structure and the material properties of the snap-arm, the tongue of the snap-arm can be moved into its disengaged position by means of a finger or fingernail without any danger.

A configuration of the invention makes it possible for the end bracket that is stamped out of sheet metal to lie flush against the external contour of the head strip due to its low material thickness. This makes the end bracket visually unobtrusive, requiring very little material. In addition, the airflow that is effective during driving will not have any noticeable negative influence on the air-drag characteristics of the wiper.

While one configuration of the invention guarantees a lasting secure attachment of the end bracket to the head strip of the wiper blade, another configuration of the invention concerning the production and assembly of the end bracket to the head strip is particularly cost-effective.

In one configuration of the invention, it is made certain that the spring force of the tongue or of the snap-arm of the end bracket is optimal with regard to safe engagement and easy disengagement.

An advantageous configuration provides that the longitudinal sides and the front side of the tongue that connects the longitudinal sides pointing toward the base part are notched out of the snap-arm, and the tongue with its edge facing the free-cut front side is connected to the snap-arm, preferably in the area of the free end of the snap-arm.

However, another configuration is preferred where the tongue is cut free out of the snap-arm on one longitudinal side, and wherein the other longitudinal side of the tongue is constituted by the respective original longitudinal side of the snap-arm, and wherein the narrow edge of the tongue that faces the front side is connected to the snap-arm, preferably in the area of the free end of the snap-arm. Even if the snap-arm is not very wide, the tongue can be designed wide enough to have the necessary stability.

Especially preferred is a configuration in which the guiding arm of the end bracket is provided on the opposite longitudinal side of the head strip in addition to the snap-arm, and also traverses the end claw of the retaining structure at its interior side, so as to support itself on the inside of the end claw during operation of the wiper or whenever a force acts upon it from the outside such as may develop through the brushes of car wash installations or during the operation of the wiper. This prevents a tilting of the end bracket that is attached to a head strip in relation to the longitudinal direction of the head strip and, thus, prevents an inadvertent disengagement of the locking of the end bracket with the end claw. In other words, a safe positive engagement of the end bracket with the end claw of the retaining structure is guaranteed.

Another advantageous configuration of the invention is characterized in that the end claw which is attached to the head strip features two snap-arms that are configured mirror-symmetrically in relation to the vertical longitudinal center plane of the wiper blade, and that each extend flat along one of the longitudinal sides of the head strip of the wiper blade that are located opposite one another. In this case, the removal of the wiper blade to be replaced or of the replacement kit to be replaced is somewhat more difficult because both snap-arms have to be bent into a disengaged position. However, this configuration has the advantage of a particularly secure longitudinal lock of the wiper blade or of the exchange kit on the retaining structure.

In order to make the installation of a new wiper blade or a new replacement kit into the retaining structure easier or in order to make it easier for the one snap-arm or the two snap-arms of the end bracket to automatically snap into place on the retaining structure, it is provided that on the pertinent end claw of the retaining structure, a feeding ramp for the one snap-arm or for the two snap-arms of the end bracket is configured. It is even advantageous to configure identical introduction ramps on both of the opposite end claws of the retaining structure regardless of the fact that only one of them would be used at a time. This approach simplifies the production of the retaining structure because identical parts can be used and, in addition, it becomes unnecessary to assemble the rubber wiper blades in correct position since the retaining structure could, if necessary, be symmetrically inverted.

It is again emphasized that the invention is also aimed toward an exchange kit for a wiper. This exchange kit is for a wiper of a windshield wiping device for cleaning a windshield on a vehicle, wherein the complete pre-assembled exchange kit consists of a wiper blade of elastic rubber-like material, one or more spring rail(s) that are located in the head strip that is part of the wiper blade, and an end bracket for the locking of the spring rail or the spring rails that are attached to one end of the head strip, and for the longitudinal locking of the wiper blade on the retaining structure of the wiper, wherein the end bracket features a snap-arm that extends in the longitudinal direction of the head strip, and that traverses, after installing the exchange kit to the retaining structure, the correlated end claw of the retaining structure on its interior side, and engages behind a the interior front side of the end claw by means of a snap element.

BRIEF DESCRIPTION OF THE DRAWING

Based on a drawing below, further details of the invention are described in more detail. The figures show:

FIG. 2a is a plan view of FIG. 1a; and

DESCRIPTION OF THE PREFERRED EMBODIMENT

Figure 1B:
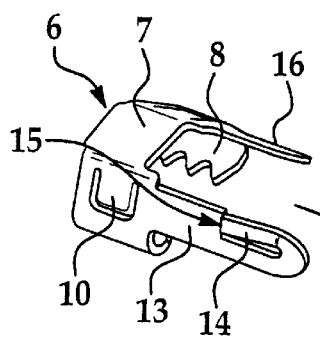
FIG. 1b is an end bracket as used in FIG. 1 shown in a perspective view.
Figure 1A:
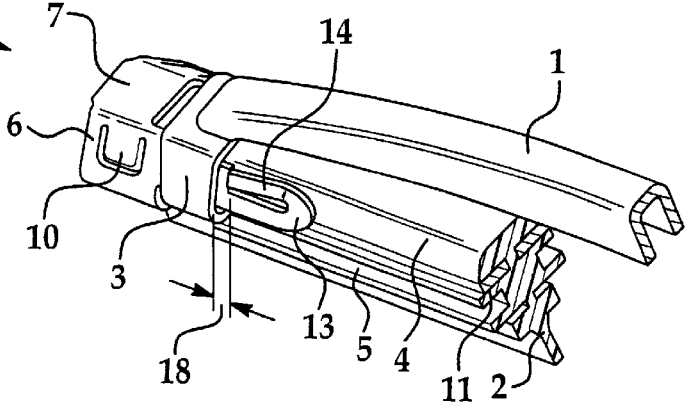
FIG. 1a is an end section of a wiper according to the invention with an exchange kit retained in a retaining structure in perspective view.
Figure 2B:
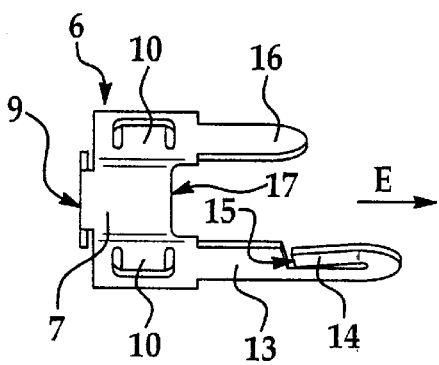
FIG. 2b is a plan view of FIG. 1b.
Figure 2A:
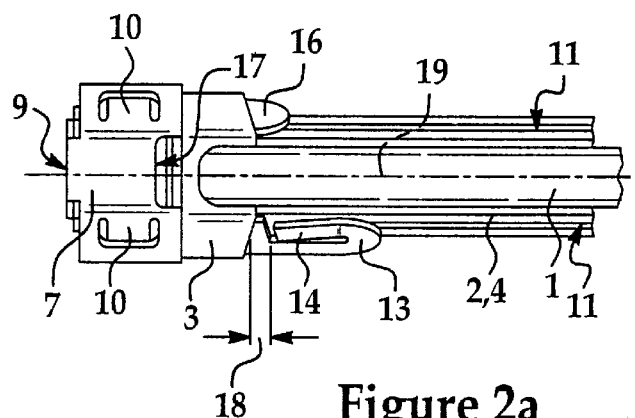

In FIGS. 1a and 2a, an end section of a wiper for a windshield wiper installation for the cleaning of a windshield on a vehicle or an end section of an exchange kit retained by the retaining structure 1 of a wiper is shown. The retaining structure 1 that can be structured as one segment or several segments features claws for the retention and guiding of a wiper blade 2 made of elastic, rubber-like material. The claws of the retaining structure 1 are configured adjoining end claw 3 as shown in FIGS. 1a and 2a and retain the head strip 4 that is part of the wiper blade 2 by way of partially gripping head strip 4 from the top engaging in the longitudinal grooves 5 that are configured on the opposite longitudinal sides of the head strip 4. In order to install the wiper blade 2 or the completely pre-assembled exchange kit into the retaining structure 1, these are inserted from the end of the retaining structure 1 shown in FIGS. 1a and 2a into the end claw 3 and into the other claws of the retaining structure 1. The insertion direction E that runs in the longitudinal direction of the wiper blade 2 or of the head strip 4 is marked with an arrow in FIGS. 1b and 2b.

Since the wiper blade 2 must be attached to the retaining structure 1, secure against inadvertent loss, a longitudinal locking of the wiper blade 2 or of the head strip 4 to the retaining structure 1 is indispensable. This is the purpose of an end bracket 6 that is permanently attached to one end of the head strip 4 that is part of wiper blade 2. The end bracket 6 (see also FIGS. 1b and 2b) is made out of sheet metal, and features a base part 7 that is essentially adapted to the external contour of the end section of the head strip 4. The base part 7 grips the end section of the head strip 4 from the top gripping with the opposite claws 8 into the same longitudinal grooves 5 of the head strip 4 that are meant for the claws of the retaining structure 1. By means of a plastic deformation of the base part 7 in the direction of the claws 8, the end bracket 6 is clamped firmly to the head strip 4. The teeth that are configured on the claws 8 of the end bracket 6 indent into the material of the head strip 4 providing a firm seat of the end bracket 6 on the head strip 4. In order to further increase the stability of this attachment, the base part 7 touches the front side of the head strip 4 with its front side wall 9, providing a more positive fit.

Also, tongue-shaped retaining sections 10, the function of which is to lock in one or two spring rails 11 in longitudinal direction at the end of the head strip 4, are cut out of the opposite side walls of the base part 7. Either one spring rail 11 is positioned in a circumferentially closed longitudinal channel of the head strip or, as in the die embodiment shown, two spring rails 11 are provided. In the latter case, the spring rails 11 are each inserted in an additional longitudinal groove that is formed at the opposite longitudinal sides of the head strip 4. To prevent slipping sidewise out of their positions, these two spring rails 11 are secured by the claws of the retaining structure 1. For the required longitudinal locking of the spring rails 11, the fastening sections 10, that are configured at the end bracket 6, are plastically deformed in an inward direction. In the embodiment shown in FIGS.

1a and 2a, the fastening sections 10 fit in corresponding recesses at the ends of the spring rails 11. In the case of the variant with only one spring rail located in a longitudinal channel of the head strip—not shown—material of the channel wall is pressed into corresponding lateral recesses of the one spring rail by means of the plastic deformation of the fastening sections 10. Thus, a complete exchange kit can be provided that contains a wiper blade 2, a spring rail or spring rails 11, and the end bracket 6 as a simple to handle assembly unit.

Of particular importance with regard to the invention is the configuration of the snap-arm 13 that is part of the end bracket 6. The snap-arm 13 has an essentially oblong shape. It starts at the base part 7 of the end bracket 6, and extends in longitudinal direction flush along one of the two longitudinal sides of the head strip 4. In this context it is not critical whether the head strip 4 has an essentially trapezoidal or rectangular traverse sectional contour. As a snap element on the snap-arm 13, a tongue 14 is configured so that its oblong rectangular shape is oriented in the longitudinal direction of the snap-arm 13 or of the head strip 4. The tongue 14 is cut free at its front side 15 that faces toward the base part 7 of the end bracket 6 from the rest of the snap-arm 13 in the manner of a notch, and is bent at a flat steep angle away from the head strip 4 and out of the plane of the snap-arm. The longitudinal side that faces the notched longitudinal side of the tongue 14 is constituted by a part of the original longitudinal side of the snap-arm and, on its narrow edge that faces the frontal side 15, the tongue 14 is connected to the remainder of the snap-arm in the area of the free end of the snap-arm 13.

Part of the end bracket 6 is an oblong flat guiding arm 16 that, looking at the base part 7 of the end bracket 6, extends flush along the longitudinal side of the head strip 4 that faces the snap-arm 13. When the wiper blade 2 or the complete pre-assembled exchange kit is assembled to the retaining structure 1 of the wiper, the snap-arm 13 and the guiding arm 16, as shown in FIG. 2a, traverse the end claw 3 to end bracket 6 of the retaining structure 1 on its interior side. The snap-arm 13 and the guiding arm 16 can support themselves with their external surfaces upon the interior surface of the end claw 3, and the front edge 15 of the tongue 14 that has been cut free faces the inner front side of the end claw 3 of the retaining structure 1 as a stop. Also, since the interior front side 17 of the base part 7 of the end bracket 6 interfaces with the external front side of the end claw 3 as a stop, the required longitudinal lock of the wiper blade 2 or of the exchange kit to the retaining structure 1 is guaranteed. The small amount of longitudinal play 18 between the end bracket 6 and the end claw 3 that can be seen in FIGS. 1a and 2a and that does not negatively influence the function of the wiper can be advantageously used to compensate for dimensional tolerances.

In the preferred embodiment of the invention as shown in FIGS. 1a and 2a, the retaining arm 13 and the guiding arm 16 are supported on the opposite longitudinal sides of the head strip 4, and traverse the end claw 3 on its interior surface, thus guaranteeing a particularly tight-fit construction and an especially secure lock of the end bracket 6 on the wiper blade 2.

In order to combine a wiper blade 2 or a completely pre-assembled exchange kit with a retaining structure 1 to form a wiper, the exchange kit is inserted from one end in the insertion direction E into the end claw 3 or the retaining claw of the retaining structure in such a manner that it engages in the longitudinal grooves 5 on the longitudinal sides of the head strip 4 that is of part of the wiper blade 2.

Toward the end of this insertion process, first the longer snap-arm 13 and then the shorter guiding arm 16 slip underneath the inner surface of the respective end claw 3 of the retaining structure 1. Since the free ends of the snap-arm 13 and of the guiding arm 16 are tapered in width to ease insertion, the snap-arm 13 and the guiding arm 16 seat themselves in their respective positions automatically as they traverse the end claw 3 on its interior side. When the tongue 14 of the snap-arm 13 that serves as a snap element, passes the interior side of the end claw 3, upon insertion, it is temporarily bent by elasticity in the direction of the head strip 4 and across the metal thickness of the snap-arm 13. It snaps back into its normal position behind the interior front side of the end claw 3. Thus, the snap-arm 13 of the end bracket 6 traverses the end claw 3 at its interior side and snaps with the tongue 14 behind the internal front side of the end claw 3, establishing the required longitudinal locking of the wiper blade 2 or of the exchange kit to the retaining structure 1.

In order to disassemble the wiper blade 2 or the exchange kit from the retaining structure 1, the tongue 14 on the snap-arm 13 of the end bracket 6 is bent against its spring force into a release position by finger or fingernail pressure or by means of a tool either alone or together with the snap-arm 13. Simultaneously, the end bracket 6 or the wiper blade 2 or the exchange kit are extracted opposite to the insertion direction E from the retaining claws of structure 1.

Figure 3:
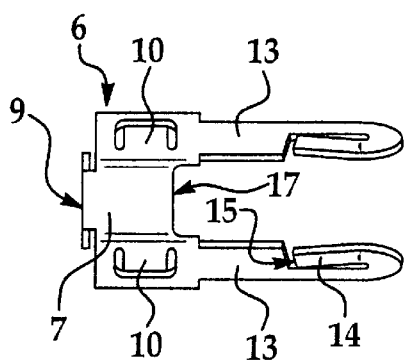
FIG. 3 is an end section of a wiper according to the invention with two snap-arms configured mirror-symmetrically.

If a particularly secure longitudinal locking of the wiper blade 2 or of the exchange kit on the retaining structure 1 is desired, and if one accepts as a trade-off that the disengagement of the end bracket 6 from the end claw 3 of the retaining structure 1 is slightly more difficult, as compared to the aforementioned embodiment shown in the drawing, then the end bracket 6 should feature two snap-arms 13 that are configured and positioned mirror-symmetrically in relation to the longitudinal center plane 19 (FIG. 3). In reference to the drawing, a second snap-arm that is configured mirror-symmetrically to the first snap-arm 13 should be provided in lieu of guiding arm 16. For the removal of the wiper blade 2 or of the exchange kit from the retaining structure 1, both snap-arms 13 or the tongues 14 on the snap-arms; 13 must be pushed into the disengagement position, and the end bracket 6 with the wiper blade 2 must be longitudinally extracted from the retaining claws of the retaining structure 1.

The construction, handling, and function of a completely pre-assembled exchange kit, about which the invention also concerns, can be discerned from the drawing and the aforementioned description such that these issues do not have to be shown and described separately again.

What is claimed is:

1. A wiper for a windshield wiper installation for the cleaning of a windshield of a vehicle with an exchangeable wiper blade of elastic rubbery material retained on a retaining structure by means of retaining claws of the retaining structure gripping at least partially around a head strip formed as part of the wiper blade and engaging in longitudinal grooves formed on opposite longitudinal sides of the head strip, and an end bracket attached to one end of the head strip retains the wiper blade in a longitudinal direction on the retaining structure in a fashion that prevents inadvertent loss, a snap-arm formed as part of the end bracket extends along the head strip and traverses a corresponding end claw of the retaining structure on an interior surface and snaps behind an interior front side of the end claw by means of a snap element, the wiper comprising:

the snap-arm of the end bracket having an essentially flat oblong shape and extending flush along one longitudinal side of the head strip; and the snap element having a tongue notched free out of the snap-arm bent upward at an acute angle from the head strip from a plane of the snap-arm, a front side of the tongue opposes as a stop the interior front side of the end claw of the retaining structure.

2. The wiper according to claim 1 wherein the end bracket is made of sheet metal.

3. The wiper according to claim 1 further comprising:
the end bracket gripping at least partially around an end of the head strip as part of the wiper blade by means of a base part and the claws of the end bracket positioned opposite one another engaging in longitudinal grooves of the head strip assigned to the retaining claws of the retaining structure and are clamped in the head strip by way of plastic deformation.

4. The wiper according to claim 1 wherein the end bracket is configured as a single one-piece assembly element and is attached to the head strip as part of the wiper blade without the use of any additional components.

5. The wiper according to claim 1 wherein one of the tongue and the snap-arm of the end bracket can be bent elastically across a thickness of the snap-arm.

6. The wiper according to claim 1 wherein the longitudinal sides and the front side of the tongue that faces a base part and connects the longitudinal sides are notched free out of the snap-arm and the tongue is connected by a narrow edge opposing the notched-free front side to the snap-arm in the area of the free end of the snap-arm.

7. The wiper according to claim 1 wherein the tongue is notched free out of the snap-arm on a longitudinal side and on the front side facing a base part, while the other longitudinal side of the tongue is formed by the corresponding original longitudinal side of the snap-arm and a narrow edge of the tongue located opposite from the front side is connected to the snap-arm in the area of the free end of the snap-arm.

8. The wiper according to claim 1 further comprising:
an essentially flush guiding arm on the end bracket extending, starting at a base part of the end bracket, flush along the longitudinal side of the head strip part of the wiper blade located opposite the snap-arm, and traversing the end claw of the retaining structure correlated with the end bracket at an interior side of the end claw without snapping in behind the end claw.

9. The wiper according to claim 1 wherein the end bracket that is attached to the head strip includes two snap-arms configured mirror-symmetrically in relation to a vertical longitudinal center plane of the wiper blade, and extend flush along one of the opposite longitudinal sides of the head strip.

10. The wiper according to claim 1 further comprising:
two end claws of the retaining structure that are located opposite from each other; and an insertion ramp configured for the two end claws of the retaining structure that are located opposite from each other.

11. An exchange kit for a wiper of a windshield wiper installation for cleaning a windshield on a vehicle, wherein the complete pre-assembled exchange kit consists of a wiper blade of elastic rubbery material, at least one spring rail located and retained in a head strip formed as part of the wiper blade, and an end bracket attached to one end of the head strip locking the at least one spring rail onto the head strip and for longitudinal locking of the wiper blade to a retaining structure of the wiper, wherein the end bracket includes a snap-arm extending in a longitudinal direction of the head strip and that, after installation of the exchange kit onto the retaining structure, traverses a correlated end claw of the retaining structure at an interior side and snaps in place behind an interior front side of the end claw by means of a snap element having a tongue notched free out of the snap-arm bent upward at an acute angle from the head strip from a plane of the snap-arm, a front side of the tongue opposes, as a stop, the interior front side of the end claw of the retaining structure.

12. A wiper for a windshield comprising:
an exchangeable wiper blade of elastic material having a head strip;
a retaining structure having retaining claws for griping at least partially around the head strip, the claws engaging in longitudinal grooves formed on opposite longitudinal sides of the head strip;
an end bracket attached to one end of the head strip for retaining the wiper blade in a longitudinal direction on the retaining structure to prevents inadvertent loss; and
a snap-arm formed integral with the end bracket extending along the head strip and traversing a corresponding end claw of the retaining structure on an interior surface, the snap-arm snapping behind an interior front side of the corresponding end claw with a snap element, the snap-arm having an essentially flat oblong shape and extending flush along one longitudinal side of the head strip, the snap element having a tongue notched free out of the snap-arm bent upward at an acute angle from the head strip from a plane of the snap-arm, a front side of the tongue opposing as a stop the interior front side of the end claw.

13. The wiper according to claim 12 wherein the end bracket grips at least partially around the end of the head strip with a base part and the claws of the end bracket are positioned opposite one another engaging in longitudinal grooves of the head strip and plastically deformed to clamp in the head strip.

14. The wiper according to claim 12 wherein one of the tongue and the snap-arm can be bent elastically relative to the headstrip.

15. The wiper according to claim 12 wherein the longitudinal sides and the front side of the tongue face a base part and the longitudinal sides a re notched free out of the snap-arm and the tongue is connected by a narrow edge.

16. The wiper according to claim 12 wherein the end bracket is a one-piece assembly attached to the head strip as part of the wiper blade.

17. The wiper according to claim 12 wherein the tongue is notched free out of the snap-arm corresponds to a longitudinal side of the snap-arm.

18. The wiper according to claim 12 further comprising:
an essentially flush guiding arm on the end bracket extending, starting at a base part of the end bracket, flush along the longitudinal side of the head strip part of the wiper blade located opposite the snap-arm, and traversing the end claw of the retaining structure correlated with the end bracket at an interior side of the end claw without snapping in behind the end claw.

19. The wiper according to claim 12 wherein the end bracket includes two snap-arms configured mirror-symmetrically in relation to a vertical longitudinal center plane of the wiper blade, and extending flush along one of the opposite longitudinal sides of the head strip.

20. The wiper according to claim 12 further comprising:
two end claws of the retaining structure oppositing each other; and
an insertion ramp configured for the two end claws.

* * * * *